UNITED STATES PATENT OFFICE.

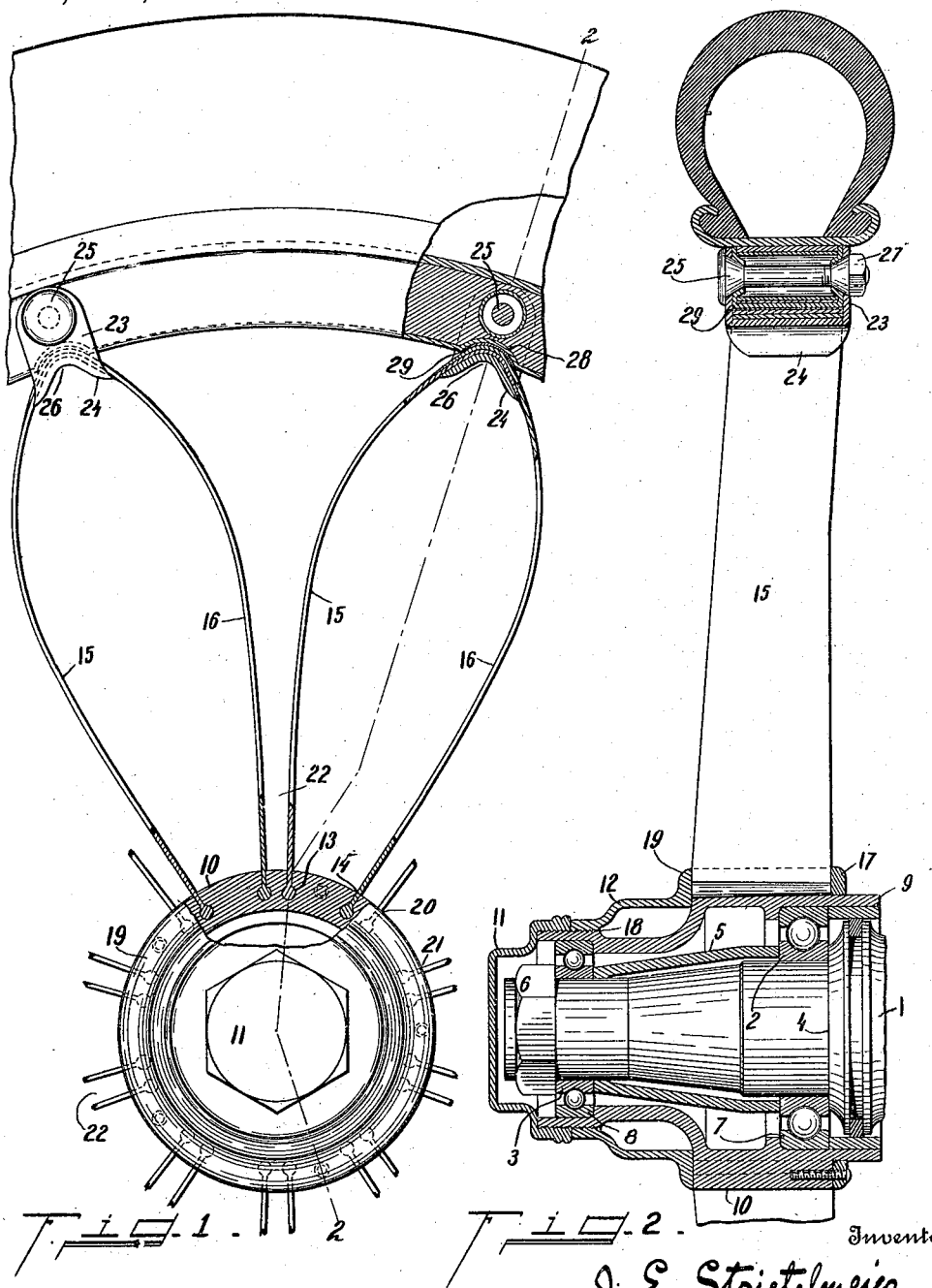

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

TAPER-PIN SPOKE-FASTENING.

1,217,361.  Specification of Letters Patent.  Patented Feb. 27, 1917.

Application filed May 31, 1913, Serial No. 770,952. Renewed April 10, 1916. Serial No. 90,277.

*To all whom it may concern:*

Be it known that I, JOHN E. STRIETELMEIER, a citizen of the United States, and residing at Cincinnati, in the county of Hamilton and State of Ohio, have invented a new and Improved Taper-Pin Spoke-Fastening, of which the following specification is a full disclosure.

This invention contemplates improvements in a type of resilient wheel, which embodies resilient spokes radiating from a special non-demountable hub; and which embodies an improved few part spring-wheel unit having special demountable spring spokes radiating from a special hub-element adapted to be non-demountably arranged on standard roller bearings.

One object of this invention is to create improvements in the character of the spring-spokes or spoke-elements as well as in the fastenings, making the same applicable in connection with various types of rims and hub, and especially to devise a very simple means for retaining or releasing the mounting of the springs on the hub.

Another object is to create a very simple and cheap resilient wheel composed of very few parts and adapted bodily to take the place of wooden wheels.

Another object is to render available a superior resilient wheel structure utilizing flat metal spokes of a special character having a very long life against fracture, and mounted on their hub in a way affording the fewest possible elements while yet attaining great lightness.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a fragmentary side elevation partly in section of a very simple form of resilient wheel embodying newly invented features.

Fig. 2 is a section through line 2—2 of Fig. 1, showing further details of the same.

Continuing now by way of a more detailed description, it may be noted that this invention deals with the general proposition of enabling purchasers to use a superior type of wheel at the least possible expense while enabling them to select such capacities as they may desire. That is to say, a very inexpensive structure is made available to those who may utilize the same without having completely to discard already purchased wooden wheels, and a further structure is proposed whereby the spokes may be demountable from the hub without disturbing the bearings.

Referring first to Figs. 1 and 2 there will be seen a very simple wheel organization adapted to be used as a whole in place of ordinary wooden wheels. Here, 1 indicates a conventional axle on which is retained ball race-ways 2 and 3, these parts being positioned by means of a shoulder 4, a spacer 5 and a nut 6, as will be understood. The complementary race-ways 7 and 8 are held in place by suitable shoulders provided by a special hub 9 that closely conforms to conventional hub proportions, save that the spoke-receiving periphery 10 is somewhat thicker, certain spoke retaining flanges are dispensed with and provision is made whereby the cap 11 has a lock-nut relation with a retainer 12.

Extending axially through the hub portion 10 is a series of apertures 13, which provide radial slots 14, adapted to receive the shanks of the elements 15 and 16 of the spring spoke. Preferably these apertures 13 will be slightly tapered and the extremities of the spoke springs 15 and 16 will be swaged to form a bead correspondingly tapered so that as they are driven into the apertures 13 they will become tightly wedged in place. A retaining ring 17 may be secured in position against the inner end of the portion 10, to aline the spoke elements in the same peripheral plane, and the retainer 12 is preferably screw threaded at 18 to a reduced end of the hub 9. This retainer 12 provides an angular portion 19 that closes the apertures 13 and keeps the spring spoke elements in the same peripheral plane. The cap 11 fulfils the office both of grease retainer and a lock nut for the retainer 12. The spoke elements 15 and 16 are shaped as shown by Fig. 1, being constructed of flat sheet metal and preferably has separate pieces of metal each suitably secured to the rim, as for example in the manner shown by Fig. 1. That is to say, these spoke elements 15 and 16 connect with the hub at points 20 and 21 that are widely spaced circumferentially, leaving, however, gaps 22 between the right and left handed adjacent elements, so that a full resiliency is provided while yet enabling a polishing cloth to be inserted between the members. The curve to which each of these spokes corresponds is preferably that defined by my application, Serial No. 720,521, filed September 16, 1912.

At the rim ends the spoke elements are bent to interfit one another by circular arcs and their extremities may be feathered or tapered to form resilient reinforcements for one another. A retaining clip 23, having its sides turned up in parallelism and having its straddle portion 24 swaged into the form shown, is secured by a suitable taper-bolt 25 to the rim. The dished portion 26 conforms to the curve of the interfitting ends, and since the conical bearing surfaces of the taper-bolt fit in the corresponding recesses of the rim, when the nut 27 is tightened, the U-shaped straddle clip 23 will be drawn radially outward so as to bind the spring ends together and into a circular recess 28 provided by the inner periphery of the rim. An intervening washer 29 of brass may be used with advantage.

It will be noted that the above described structure forms a complete wheel, consisting of the fewest possible parts, and while it is not demountable without disturbing the bearings, it forms a durable and very inexpensive construction.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent of the United States:—

1. A resilient wheel of the nature disclosed combining a hub; a rim providing at its inner periphery an equispaced series of shallow recesses extending transversely to the plane of the wheel; a series of petal-shaped spokes extending radially from the hub and terminating in overlapping extremities arranged in said recesses; each spoke consisting of two symmetrically related flat leaf-springs, the outer one having its rim-end turned reversely in conformity with said recess and snugly seated therein, and the inner one having its rim-end similarly turned and interfitting within the other, the ends of each of said springs terminating a short distance inwardly from the inner periphery of the rim; a clamping-plate extending transversely to the plane of the wheel within the inturned ends of said springs and having its contacting face conformed to the adjacent spring and having both its ends turned outwardly in parallelism with the sides of the rim and each end portion providing a beveled face, and a pair of members having co-operating beveled faces and supported from the rim and adapted to be moved relatively to one another in a direction transverse to the plane of the wheel to move said clamping plate in a radial direction to clamp said spring ends.

2. A resilient wheel of the nature disclosed combining a hub; a rim providing at its inner periphery an equispaced series of shallow recesses extending transversely to the plane of the wheel; a series of petal-shaped spokes extending radially from the hub and terminating in overlapping extremities arranged in said recesses; each spoke consisting of two symmetrically related flat leaf-springs, the outer one having its rim-end turned reversely in conformity with said recess and snugly seated therein, and the inner one having its rim-end similarly turned and interfitting within the other, the end of each of said springs terminating a short distance inwardly from the inner periphery of the rim; a clamping-plate extending transversely to the plane of the wheel within the inturned ends of said springs and having its contacting face conformed to the adjacent spring and having both its ends bent outwardly in parallelism and apertured, a member extending transversely through the rim and having a wedging relation with said rim, and engaging the edges of said apertures, and means for moving said member transversely to the wheel to draw said clamping plate radially upward.

3. A resilient wheel of the nature disclosed combining a hub; a rim providing at its inner periphery an equispaced series of shallow recesses extending transversely to the plane of the wheel; a series of petal-shaped spokes extending radially from the hub and terminating in overlapping extremities arranged in said recesses; each spoke consisting of two symmetrically related flat leaf-springs, the outer one having its rim-end turned reversely in conformity with said recess and snugly seated therein, and the inner one having its rim-end similarly turned and interfitting within the other, the ends of each of said springs terminating a short distance inwardly from the inner periphery of the rim; a clamping-plate extending transversely to the plane of the wheel within the inturned ends of said springs and having its contacting face conformed to the adjacent spring and having both its ends terminating at the sides of the rim, and means movable in a direction transverse to the plane of the wheel and coöperating with said clamping plate to draw the same radially outward.

In witness whereof, I hereunto subscribe my name, as attested by the two subscribing witnesses.

JOHN E. STRIETELMEIER.

Witnesses:
 ALBERT F. NATHAN,
 CLARENCE B. FOSTER.

Copies of this patent may be obtained for five cents each, by addressing the "Commissioner of Patents, Washington, D. C."